(12) United States Patent
Gutala et al.

(10) Patent No.: US 10,770,372 B2
(45) Date of Patent: Sep. 8, 2020

(54) FLUID ROUTING DEVICES AND METHODS FOR COOLING INTEGRATED CIRCUIT PACKAGES

(71) Applicant: Altera Corporation, San Jose, CA (US)

(72) Inventors: Ravi Gutala, San Jose, CA (US); Arif Rahman, San Jose, CA (US); Aravind Dasu, Milpitas, CA (US); Thomas Sarvey, Atlanta, GA (US); Devdatta Kulkarni, Olympia, WA (US)

(73) Assignee: Altera Corporation, San Jose, CA (US)

( * ) Notice: Subject to any disclaimer, the term of this patent is extended or adjusted under 35 U.S.C. 154(b) by 50 days.

(21) Appl. No.: 15/274,335

(22) Filed: Sep. 23, 2016

(65) Prior Publication Data

US 2018/0090417 A1    Mar. 29, 2018

(51) Int. Cl.
*H01L 23/473* (2006.01)
*H01L 23/367* (2006.01)
(Continued)

(52) U.S. Cl.
CPC .............. *H01L 23/473* (2013.01); *G06F 1/20* (2013.01); *G06F 30/39* (2020.01); *G06F 30/398* (2020.01); *H01L 21/4882* (2013.01); *H01L 23/34* (2013.01); *H01L 23/367* (2013.01); *H01L 23/3672* (2013.01); *H01L 23/3675* (2013.01);
(Continued)

(58) Field of Classification Search
CPC ......... H01L 23/50; H01L 23/34; H01L 23/46; H01L 23/473; H01L 23/367; H01L 23/672; H01L 23/3675; H01L 23/3677
See application file for complete search history.

(56) References Cited

U.S. PATENT DOCUMENTS 7,126,822 B2   10/2006   Hu et al.
7,204,298 B2    4/2007   Hodes et al.
(Continued)

OTHER PUBLICATIONS

Korean Intellectual Property Office, International Search Report for international application PCT/US2017/050539, dated Dec. 26, 2017, pp. 1-3.
(Continued)

*Primary Examiner* — Allen L Parker
*Assistant Examiner* — Gustavo G Ramallo
(74) *Attorney, Agent, or Firm* — Steven J. Cahill

(57) ABSTRACT

A fluid routing device includes a fluid inlet, first vertical channels, a horizontal channel, a second vertical channel, and a fluid outlet. The first vertical channels are open to the fluid inlet. The horizontal channel is open to each of the first vertical channels. The first vertical channels are oriented to provide fluid coolant from the fluid inlet vertically down to the horizontal channel. The horizontal channel is open on one side such that fluid coolant in the horizontal channel directly contacts an apparatus attached to a bottom of the fluid routing device. The second vertical channel is open to the horizontal channel. The second vertical channel is oriented to provide fluid coolant vertically up away from the horizontal channel. The fluid outlet is open to the second vertical channel such that fluid coolant from the second vertical channel exits the fluid routing device through the fluid outlet.

19 Claims, 11 Drawing Sheets

(51) Int. Cl.
  *H01L 23/46* (2006.01)
  *H01L 23/34* (2006.01)
  *G06F 1/20* (2006.01)
  *G06F 30/39* (2020.01)
  *G06F 30/398* (2020.01)
  *H01L 21/48* (2006.01)
  *H01L 23/40* (2006.01)
  *G06F 119/08* (2020.01)

(52) U.S. Cl.
  CPC .......... *H01L 23/3677* (2013.01); *H01L 23/46* (2013.01); *G06F 2119/08* (2020.01); *G06F 2200/201* (2013.01); *H01L 23/4006* (2013.01); *H01L 2023/4056* (2013.01); *H01L 2224/16225* (2013.01); *H01L 2224/73253* (2013.01)

(56) References Cited

U.S. PATENT DOCUMENTS

| | | | |
|---|---|---|---|
| 7,336,487 B1 | 2/2008 | Chrysler et al. | |
| 7,348,665 B2 | 3/2008 | Sauciuc et al. | |
| 8,797,741 B2* | 8/2014 | Altman | F28F 3/12 |
| | | | 165/104.33 |
| 9,061,382 B2* | 6/2015 | Campbell | H05K 7/2029 |
| 2004/0104022 A1* | 6/2004 | Kenny | F04B 17/00 |
| | | | 165/299 |
| 2004/0112585 A1* | 6/2004 | Goodson | F28D 15/00 |
| | | | 165/299 |
| 2005/0139996 A1 | 6/2005 | Myers et al. | |
| 2005/0200001 A1* | 9/2005 | Joshi | F28F 3/08 |
| | | | 257/712 |
| 2005/0212121 A1 | 9/2005 | Ravi et al. | |
| 2007/0034356 A1* | 2/2007 | Kenny et al. | H01L 23/473 |
| | | | 165/80.4 |
| 2010/0230079 A1* | 9/2010 | Byers | F28D 15/0275 |
| | | | 165/158 |
| 2016/0029516 A1* | 1/2016 | Sever | F28F 3/022 |
| | | | 165/80.3 |
| 2016/0143189 A1 | 5/2016 | Campbell et al. | |
| 2016/0165755 A1* | 6/2016 | Bodenweber | H01L 23/46 |
| | | | 165/80.2 |
| 2017/0082372 A1* | 3/2017 | Vos | F28D 20/02 |

OTHER PUBLICATIONS

Korean Intellectual Property Office, Written Opinion of the International Searching Authority for international application, PCT/US2017/050539, dated Dec. 26, 2017, pp. 1-8.

* cited by examiner

FLUID ROUTING DEVICES AND METHODS FOR COOLING INTEGRATED CIRCUIT PACKAGES

FIELD OF THE DISCLOSURE

The present disclosure relates to fluidic cooling, and more particularly, to fluid routing devices and methods for cooling integrated circuit packages.

BACKGROUND

In a semiconductor device assembly, an integrated circuit (IC) die (also referred to as a semiconductor chip or device) may be mounted on a packaging substrate. As logic and power density of IC dies increase, device cooling has become a more significant concern. Conventional cooling techniques, which depend on heat sinks on the backs of IC dies to transfer heat into streams of forced air, will not be able to meet the needs of power-hungry devices, especially in packages that pack more processing power into less space within IC dies. The power generated during high volume operation by such devices may reduce the overall cooling efficiency, and create localized regions of high temperature (i.e., hot spots), which may adversely affect the overall performance and reliability of the devices.

BRIEF SUMMARY

Embodiments of the present invention can be implemented in numerous ways, such as a process, an apparatus, a system, or a device. Several embodiments of the present invention are described below.

According to an embodiment, a fluid routing device includes a fluid inlet, first vertical channels, a horizontal channel, a second vertical channel, and a fluid outlet. The first vertical channels are open to the fluid inlet. The horizontal channel is open to each of the first vertical channels. The first vertical channels are oriented to provide fluid coolant received from the fluid inlet vertically down to the horizontal channel. The horizontal channel is open on one side such that fluid coolant in the horizontal channel directly contacts an apparatus attached to a bottom of the fluid routing device. The second vertical channel is open to the horizontal channel. The second vertical channel is oriented to provide fluid coolant vertically up away from the horizontal channel. The fluid outlet is open to the second vertical channel such that fluid coolant received from the second vertical channel exits the fluid routing device through the fluid outlet.

Various objects, features, and advantages of the present invention will become apparent upon consideration of the following detailed description and the accompanying drawings.

DETAILED DESCRIPTION

Some fluid cooling systems include cold plates that are attached to a heat spreader in an integrated circuit package with thermal interface material (TIM) between the cold plate and the heat spreader. The path of the fluid coolant through the cold plate is separate from the heat spreader. The fluid coolant does not directly contact the heat spreader. Any additional materials and/or material interfaces between the fluid coolant and the source of heat increase thermal resistance, limiting the effectiveness of heat transfer to the coolant. According to some embodiments disclosed herein, fluidic cooling systems and methods are provided in which a fluid routing device is directly connected to a heat spreader in an integrated circuit package without a thermal interface material (TIM) there between. Fluid coolant flowing through the fluid routing device directly contacts the heat spreader.

Figure 1:
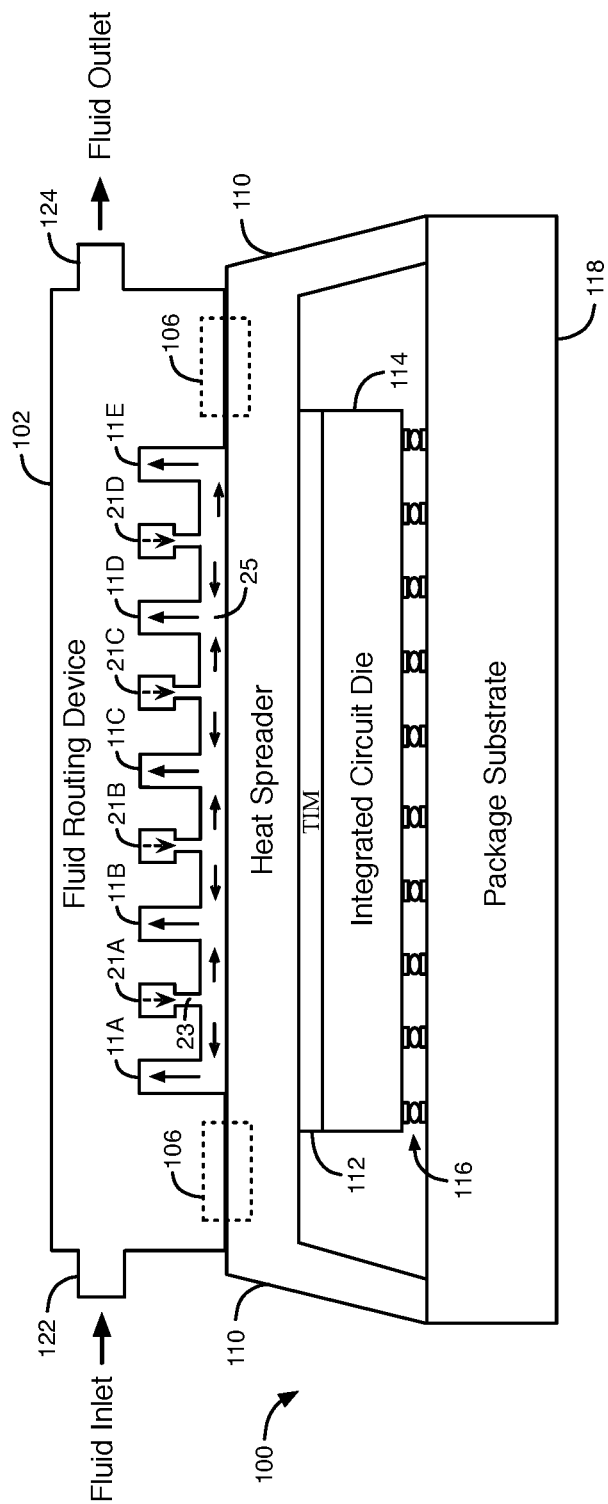
FIG. 1 shows a cross section view of an example of a fluidic cooling system for an integrated circuit package, in accordance with one embodiment of the present invention.
Figure 2:
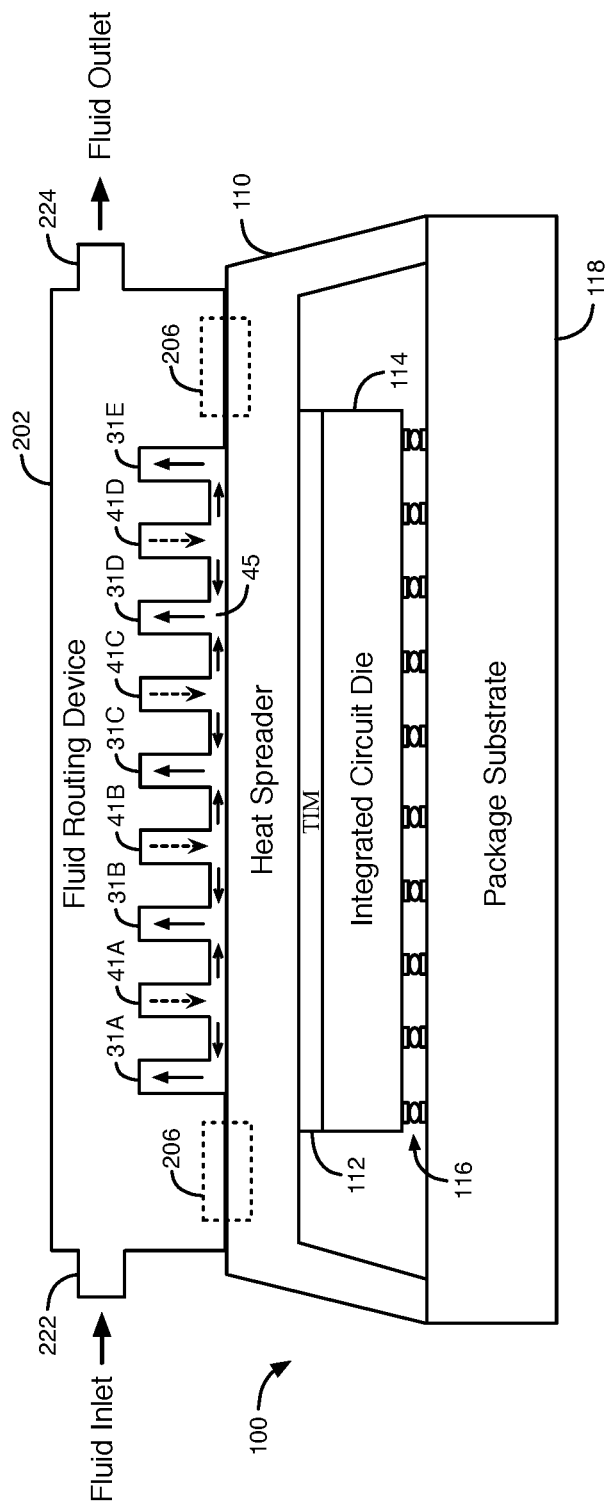
FIG. 2 shows a cross section view of another example of a fluidic cooling system for an integrated circuit package, in accordance with another embodiment of the present invention.

Examples of these embodiments are shown and described herein with respect to FIGS. 1-2.

Figure (FIG. 1 shows a cross section view of an example of a fluidic cooling system for an integrated circuit package, in accordance with one embodiment of the present invention. The fluidic cooling system of FIG. 1 includes an integrated circuit (IC) package 100 and a fluid routing device 102. IC package 100 includes IC die 114, solder bumps 116, and package substrate 118. IC die 114 may be, for example, a field-programmable gate array (FPGA) die, a processor IC die, a memory IC die, an analog IC die, or another type of IC die. As shown in FIG. 1, IC die 114 may be coupled to package substrate 118 through solder bumps 116. It should be appreciated that even though one IC die is shown in the embodiment of FIG. 1, depending on the required functionality of the integrated circuit package, two or more IC dies may be included within integrated circuit package 100.

IC package 100 also includes heat spreader 110 and thermal interface material (TIM) 112. As shown in FIG. 1, heat spreader 110 is mounted on package substrate 118. TIM 112 is located between heat spreader 110 and IC die 114. FIG. 1 also illustrates a fluid routing device 102. Fluid routing device 102 is mounted on top of the IC package 100 directly on the heat spreader 110. Fluid routing device 102 may be made of any sturdy material, such as metal or a suitable plastic. Fluid routing device 102 is connected to heat spreader 110 through connection 106. Examples of connection 106 are shown and described herein with respect to FIGS. 3 and 4A-4C.

Fluid routing device 102 includes a fluid inlet 122, a fluid outlet 124, vertical fluidic channels 11A-11E, vertical fluidic channels 21A-21D, and horizontal fluidic channel 25. A fluid coolant is delivered to fluid routing device 102 through the fluid inlet 122 to remove heat from the IC package 100. The fluid coolant can be one or more of many materials capable of absorbing heat from IC package 100, such that heat is removed from IC package 100. For example, the fluid coolant may be deionized water, a mixture of water and anti-freezing solution such as propylene glycol, or refrigerant.

The fluid coolant flows into the fluid routing device 102 through the fluid inlet 122. The fluid coolant then flows from fluid inlet 122 through fluidic channels (not shown) in device 102 to fluidic channels 21A-21D. Thus, channels 21A-21D are open to the fluid inlet 122. The fluid coolant then flows vertically down through vertical fluidic channels 21A-21D to channel 25, as shown by the dotted down arrows in FIG. 1. Each of the vertical channels 21A-21D has a constricted opening directly above horizontal channel 25. For example, channel 21A has a constricted opening 23 above channel 25. The fluid coolant flows through the constricted openings in channels 21A-21D to channel 25. These constricted openings in channels 21A-21D may function as nozzles that accelerate the coolant towards the surface of heat spreader 110. The fluid coolant then flows horizontally in channel 25 from vertical channels 21A-21D to vertical channels 11A-11E, as shown by the horizontal arrows in FIG. 1. Horizontal channel 25 is perpendicular to channels 21A-21D and 11A-11E.

During the operation of integrated circuit (IC) 114, IC 114 generates heat. Some of the heat generated by IC 114 is transferred to heat spreader 110 through TIM 112. Thus, the heat spreader 110 receives heat from the integrated circuit (IC) 114 through the TIM 112 during the operation of the IC 114. Horizontal channel 25 is open on the bottom of device 102 such that fluid coolant in channel 25 directly contacts heat spreader 110. As the fluid coolant flows through channel 25, the fluid coolant directly contacts the upper surface of heat spreader 110, and as a result, heat from heat spreader 110 is more efficiently transferred to the fluid coolant in channel 25. Thus, the fluid coolant in channel 25 receives heat directly from the heat spreader 110 during the operation of the IC die 114, causing the fluid coolant to increase in temperature.

The warmed fluid coolant then flows upwards from channel 25 into vertical channels 11A-11E. The warmed fluid coolant from channel 25 flows vertically upwards through vertical channels 11A-11E, as shown by the solid up arrows in FIG. 1. The warmed fluid coolant then flows from channels 11A-11E through additional fluidic channels (not shown) in device 102 to fluid outlet 124. The warmed fluid coolant then exits the fluid routing device 102 through fluid outlet 124. Channels 11A-11E are open to the fluid outlet 124. Thus, the vertical channels 21A-21D and 11A-11E allow for the flow of fluid coolant downwards to and upwards from, respectively, channel 25 and the upper surface of heat spreader 110 in order to remove heat from IC package 100. The fluid coolant typically increases in temperature as it flows through fluid routing device 102 from inlet 122 to outlet 124, thereby removing heat from the IC package 100.

Because the fluid coolant is provided vertically down to channel 25 through vertical channels 21A-21D that are spread across the portion of the upper surface of the heat spreader 110 that is directly above IC die 114, cool fluid coolant coming directly from inlet 122 is provided more uniformly across the upper surface of the heat spreader 110, compared to a fluidic cooling system that only provides the coolant in a horizontal direction from inlet to outlet. As a result, the fluid routing device 102 provides a more uniform means of heat transfer away from IC package 100 across the upper surface of heat spreader 110.

In the fluid routing device 102, the vertical channels 21A-21D through which coolant flows down to channel 25 are interleaved between the vertical channels 11A-11E through which coolant flows up away from channel 25. Alternating up and down flowing vertical channels as in fluid routing device 102 may reduce the pressure drop in the channels and improve the efficacy of the fluidic cooling system of FIG. 1.

Because there is no thermal interface material (TIM) between the fluid coolant in channel 25 and heat spreader 110, the thermal resistance of the fluidic cooling system of FIG. 1 is reduced. As a result, the heat transfer provided by the fluid coolant as it flows through fluid routing device 102 is more efficient than the heat transfer in a fluidic cooling system that has a TIM, a portion of the fluid routing device, and/or other material between the heat spreader and the fluid coolant.

FIG. 2 shows a cross section view of another example of a fluidic cooling system for an integrated circuit package, in accordance with another embodiment of the present invention. The fluidic cooling system of FIG. 2 includes a fluid routing device 202 and integrated circuit (IC) package 100, which is described above with respect to FIG. 1. Fluid routing device 202 is mounted on top of the IC package 100 directly on the heat spreader 110, as with the previous embodiment. Fluid routing device 202 is connected to heat spreader 110 through connection 206. Examples of connection 206 are shown and described herein with respect to FIGS. 3 and 4A-4C.

Fluid routing device 202 includes a fluid inlet 222, a fluid outlet 224, vertical fluidic channels 31A-31E, vertical fluidic channels 41A-41D, and horizontal fluidic channel 45. A fluid coolant is delivered to fluid routing device 202 through the fluid inlet 222 to remove heat from the IC package 100. The fluid coolant flows from fluid inlet 222 through fluidic channels (not shown) in device 202 to vertical fluidic channels 41A-41D. Thus, channels 41A-41D are open to the fluid inlet 222. The fluid coolant then flows vertically downwards through vertical fluidic channels 41A-41D to channel 45, as shown by the dotted down arrows in FIG. 2. Horizontal channel 45 is open to channels 31A-31E and 41A-41D. The fluid coolant then flows horizontally through channel 45 from vertical channels 41A-41D to vertical channels 31A-31E, as shown by the horizontal arrows in FIG. 2. Horizontal channel 45 is perpendicular to channels 31A-31E and 41A-41D.

Horizontal channel 45 is open on the bottom of device 202 such that fluid coolant in channel 45 directly contacts heat spreader 110. As the fluid coolant flows through channel 45, the fluid coolant directly contacts the upper surface of heat spreader 110. As a result, heat from heat spreader 110 is transferred to the fluid coolant in channel 45, and the fluid coolant increases in temperature. The warmed fluid coolant then flows upwards from channel 45 into vertical channels 31A-31E. The warmed fluid coolant from channel 45 flows vertically upwards through vertical channels 31A-31E, as shown by the solid up arrows in FIG. 2. The warmed fluid coolant then flows from channels 31A-31E through additional fluidic channels (not shown) in device 202 to fluid outlet 224. Channels 31A-31E are open to fluid outlet 224. The warmed fluid coolant then exits the fluid routing device 202 through fluid outlet 224, removing heat from IC package 100. In the example of FIG. 2, channels 31A-31E and channels 41A-41D are the same or about the same width.

As with the embodiment of FIG. 1, fluid routing device 202 provides cool fluid coolant from inlet 222 more uniformly across the upper surface of heat spreader 110, because cool fluid coolant is provided vertically down to channel 45 through vertical channels 41A-41D that are spread across the portion of the upper surface of heat spreader 110 that is directly above IC die 114. As a result, the fluid routing device 202 provides a means of heat transfer away from IC package 100 that is uniform across the upper surface of heat spreader 110. In addition, the thermal resistance of the fluidic cooling system of FIG. 2 is reduced, because there is no TIM or other material between the fluid coolant in channel 45 and heat spreader 110.

Figure 3:
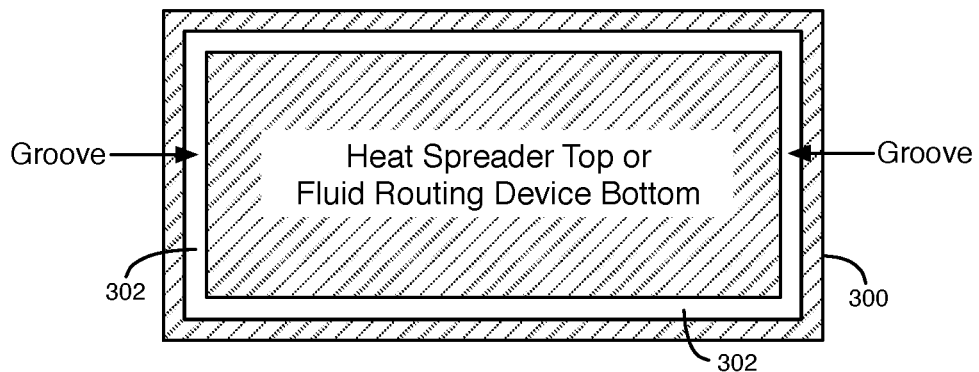
FIG. 3 is a downward or upward view of a groove in a fluid routing device or in a heat spreader, according to an embodiment of the present invention.

FIGS. 3 and 4A-4C illustrate examples of connections between a fluid routing device and an integrated circuit (IC) package, according to various embodiments of the present invention. FIG. 3 is a downward or upward view of a groove 302 in a device 300, according to an embodiment. Groove 302 is a continuous rectangular groove that is adjacent to all four sides of device 300. The groove 302 surrounds the vertical channels 11 and 21 in device 102 or vertical channels 31 and 41 in device 202. The device 300 of FIG. 3 may, for example, be the heat spreader 110 of FIGS. 1-2, the fluid routing device 102 of FIG. 1, or the fluid routing device 202 of FIG. 2. If device 300 is heat spreader 110, then FIG. 3 illustrates the top surface of the heat spreader 110, and the groove 302 is in the top surface of the heat spreader 110. If device 300 is fluid routing device 102 or 202, then FIG. 3 illustrates the bottom of the device 102 or 202, and the groove 302 is in the bottom surface of device 102 or 202, respectively.

Figure 4A:
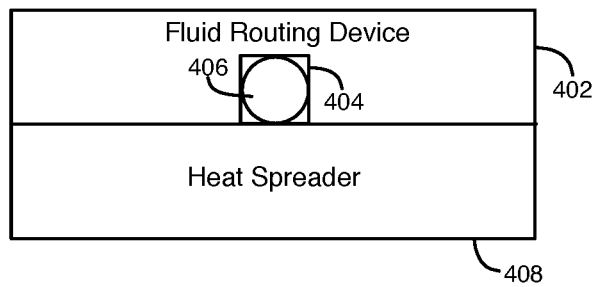
FIG. 4A illustrates an example of a connection between a fluid routing device and a heat spreader, in which a groove for receiving an O-ring is located in the fluid routing device, according to an embodiment of the present invention.
Figure 4B:
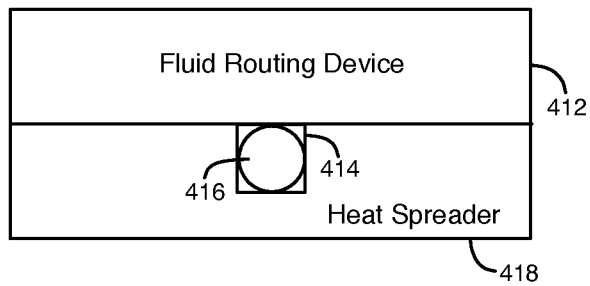
FIG. 4B illustrates an example of a connection between a fluid routing device and a heat spreader, in which a groove for receiving an O-ring is located in the heat spreader, according to an embodiment of the present invention.
Figure 4C:
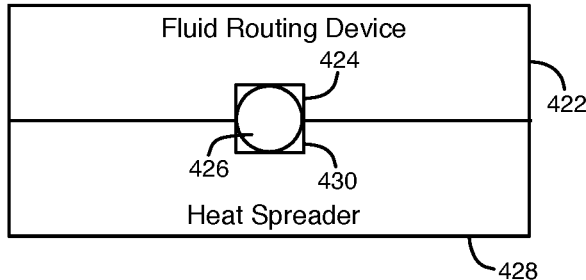
FIG. 4C illustrates an example of a connection between a fluid routing device and a heat spreader, in which grooves for receiving an O-ring are located in the fluid routing device and in the heat spreader, according to an embodiment of the present invention.

FIGS. 4A-4C are cross section views of examples of connection 106 of FIG. 1 and connection 206 of FIG. 2, according to various embodiments. FIG. 4A illustrates an example of a connection between a fluid routing device 402 and a heat spreader 408, in which a groove 404 for receiving an O-ring 406 is located in the fluid routing device 402, according to an embodiment. The groove 404 of FIG. 4A may be a cross section view of groove 302 in FIG. 3. O-ring 406 is attached to heat spreader 408. The O-ring 406 may be rectangular from a top view perspective, such that O-ring 406 is located around the upper surface of heat spreader 408 directly below the entire length of groove 404/302. The fluid routing device 402 is connected to the heat spreader 408 by fitting the O-ring 406 into the groove 404. O-ring 406 may fit snuggly into groove 404 as shown in FIG. 4A to facilitate attachment of fluid routing device 402 to the heat spreader 408.

FIG. 4B illustrates an example of a connection between a fluid routing device 412 and a heat spreader 418, in which a groove 414 for receiving an O-ring 416 is located in the heat spreader 418, according to an embodiment. The groove 414 of FIG. 4B may be a cross section view of groove 302 in FIG. 3. O-ring 416 is attached to fluid routing device 412. The O-ring 416 may be rectangular from a bottom view perspective of device 412, such that O-ring 416 is located around the bottom surface of fluid routing device 412 directly above the entire length of groove 414/302. The fluid routing device 412 is connected to the heat spreader 418 by fitting the O-ring 416 into the groove 414, as shown in FIG. 4B.

FIG. 4C illustrates an example of a connection between a fluid routing device 422 and a heat spreader 428, in which grooves 424 and 430 for receiving an O-ring 426 are located in the fluid routing device 422 and in the heat spreader 428, respectively, according to an embodiment. Each of the grooves 424 and 430 may be a cross section view of groove 302 in FIG. 3. O-ring 426 is attached to fluid routing device 422 in groove 424 or to heat spreader 428 in groove 430. The O-ring 426 may be rectangular from a top or bottom view perspective, such that O-ring 426 is in the entire length of each of the grooves 424 and 430. The fluid routing device 422 is connected to the heat spreader 428 by fitting the O-ring 426 into the other groove 424 or 430 that the O-ring 426 is not attached to, as shown in FIG. 4C.

Figure 5:
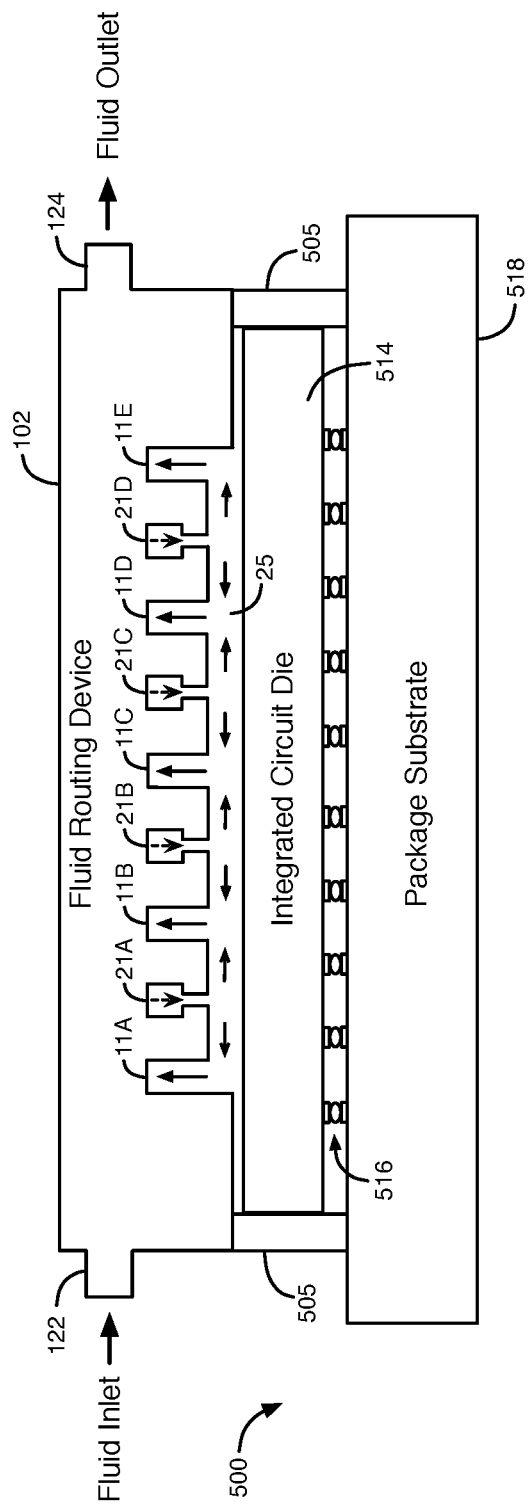
FIG. 5 shows a cross section view of an example of a fluidic cooling system for an integrated circuit package that lacks a heat spreader or thermal interface material between the IC die and the fluid routing device, in accordance with yet another embodiment of the present invention.

FIG. 5 shows a cross section view of yet another example of a fluidic cooling system for an integrated circuit package, in accordance with yet another embodiment of the present invention. The fluidic cooling system of FIG. 5 includes an integrated circuit (IC) package 500 and a fluid routing device 102, which is described above with respect to FIG. 1. IC package 500 includes an IC die 514, solder bumps 516, a package substrate 518, and mounting support 505. The fluid routing device 102 is mounted directly on top of the mounting support 505 as shown in FIG. 5. Mounting support 505 may enclose IC die 514 on all four of its sides. Mounting support 505 may support fluid routing device 102 on all four of its sides. IC die 514 is coupled to package substrate 518 through solder bumps 516.

The fluidic cooling system of FIG. 5 does not include a heat spreader or thermal interface material (TIM) between IC die 514 and fluid routing device 102. In the embodiment of FIG. 5, the horizontal channel 25 of fluid routing device 102 is directly above and open to the upper surface of the IC die 514. Thus, as fluid coolant flows through channel 25 in the fluid routing device 102, the fluid coolant in channel 25 comes into direct contact with the upper surface of the IC die 514. Because the fluid coolant in channel 25 comes into direct contact with IC die 514 in the fluidic cooling system of FIG. 5, the thermal resistance of the fluidic cooling system of FIG. 5 is reduced. As a result, the fluidic cooling system of FIG. 5 provides a more efficient means of heat transfer away from IC package 500 as the coolant flows through fluid routing device 102, compared to the heat transfer in the fluidic cooling systems of FIGS. 1-2.

Figure 6:
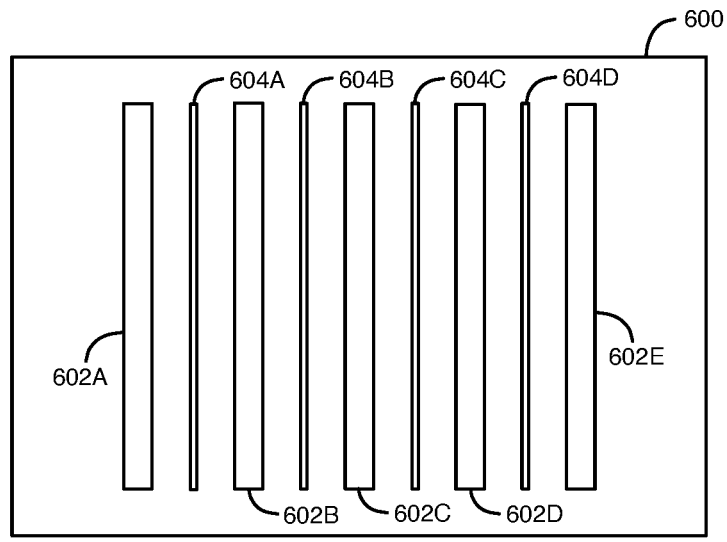
FIG. 6 shows a bottom up view of examples of rectangular vertical fluidic channels in a fluid routing device, according to an embodiment of the present invention.

FIG. 6 shows a bottom up view of examples of rectangular vertical fluidic channels in a fluid routing device 600, according to an embodiment. In the example of FIG. 6, the fluid routing device 600 includes 5 wide rectangular vertical channels 602A-602E and 4 narrow rectangular vertical channels 604A-604D. Fluid routing device 600 of FIG. 6 is an example of fluid routing device 102 shown in FIGS. 1 and 5. In this example, wide rectangular vertical channels 602A-602E are examples of vertical channels 11A-11E, respectively. Also in this example, narrow rectangular vertical channels 604A-604D are examples of vertical channels 21A-21D, respectively, which have narrow openings directly above horizontal channel 25, as shown in FIGS. 1 and 5.

Figure 7:
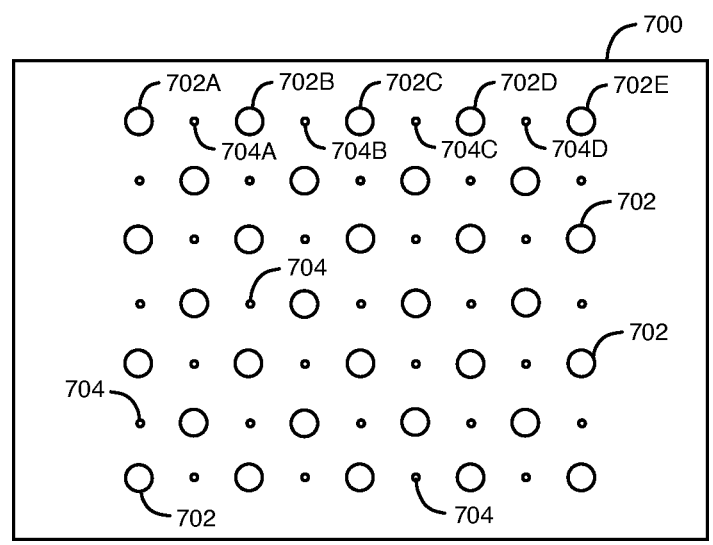
FIG. 7 shows a bottom up view of examples of circular vertical fluidic channels in a fluid routing device, according to an embodiment of the present invention.

FIG. 7 shows a bottom up view of examples of circular vertical fluidic channels in a fluid routing device 700, according to an embodiment. In the example of FIG. 7, the fluid routing device 700 includes 32 circular vertical channels 702 and 31 circular vertical channels 704. Channels 702 have larger circular openings, and channels 704 have smaller circular openings. One row of circular channels 702 and 704 in FIG. 7 are identified as channels 702A-702E and channels 704A-704D, respectively, as an example.

Fluid routing device 700 of FIG. 7 is another example of fluid routing device 102 shown in FIGS. 1 and 5. In this example, circular vertical channels 702A-702E are examples of vertical channels 11A-11E, respectively. Also in this example, circular vertical channels 704A-704D are examples of vertical channels 21A-21D, respectively.

Figure 8:
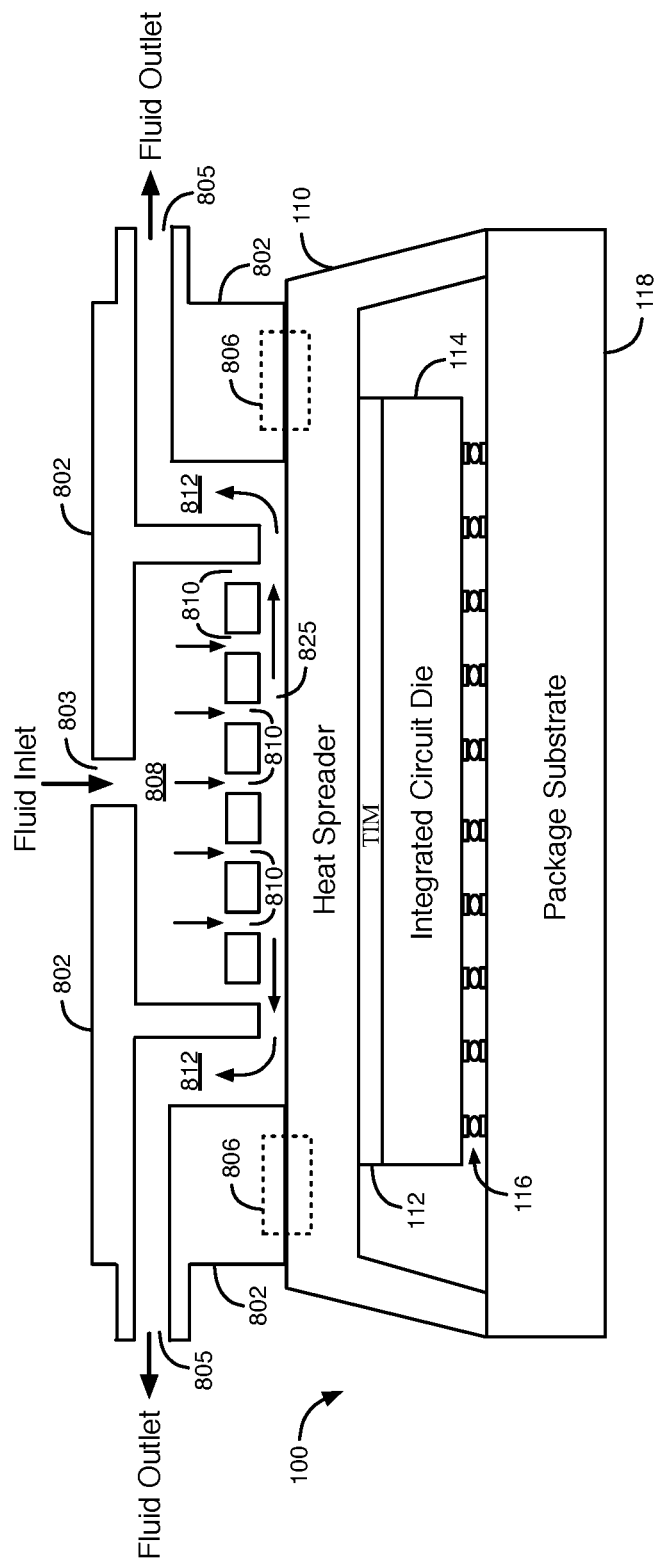
FIG. 8 shows a cross section view of an example of a fluidic cooling system for an integrated circuit package that has a fluid inlet for fluid coolant on the top of the fluid routing device, in accordance with yet another embodiment of the present invention.

FIG. 8 shows a cross section view of an example of a fluidic cooling system for an integrated circuit package that has a fluid inlet for fluid coolant on the top of the fluid routing device, in accordance with yet another embodiment of the present invention. The fluidic cooling system of FIG. 8 includes a fluid routing device 802 and an integrated circuit (IC) package 100, which is described above with respect to FIG. 1. Fluid routing device 802 is mounted on top of the IC package 100 directly on the heat spreader 110, as with the embodiment of FIG. 1. Fluid routing device 802 is connected to heat spreader 110 through connection 806. Examples of connection 806 are shown and described herein with respect to FIGS. 3 and 4A-4C.

Fluid routing device 802 includes a fluid inlet 803 on the top of the device 802, two fluid outlets 805 on the sides of the device 802, an interior chamber 808, vertical fluidic channels 810, vertical fluidic channels 812, and horizontal fluidic channel 825. A fluid coolant is delivered to fluid routing device 802 through the fluid inlet 803 to remove heat from the IC package 100. The fluid coolant flows down from fluid inlet 803 through chamber 808 to vertical channels 810, as shown by the down arrows in FIG. 8. The fluid coolant then flows vertically downwards through vertical channels 810 to horizontal channel 825. The fluid coolant then flows horizontally through channel 825 from vertical channels 810 to vertical channels 812, as shown by the arrows in FIG. 8. Horizontal channel 825 is open to and perpendicular to channels 810 and 812.

As the fluid coolant flows through channel 825, the fluid coolant directly contacts the upper surface of heat spreader 110, which causes the fluid coolant in channel 825 to receive heat from heat spreader 110 and to increase in temperature. The warmed fluid coolant then flows upwards from channel 825 into vertical channels 812, as shown by the arrows in FIG. 8. The warmed fluid coolant from channel 825 flows vertically upwards through vertical channels 812. The warmed fluid coolant then flows horizontally from channels 812 through fluid outlets 805. The fluid outlets 805 include horizontal channels that connect channels 812 with exterior openings of device 802. The warmed fluid coolant then exits fluid routing device 802 through the exterior openings at the ends of the fluid outlets 805, removing heat from IC package 100.

The fluid routing device 802 of FIG. 8 provides cool fluid coolant vertically downwards from inlet 803 directly to the upper surface of heat spreader 110 to provide an effective means of heat transfer away from IC package 100. The thermal resistance of the fluidic cooling system of FIG. 8 is reduced, because there is no TIM or other material between the fluid coolant in channel 825 and heat spreader 110, as with previous embodiments.

Figure 9:
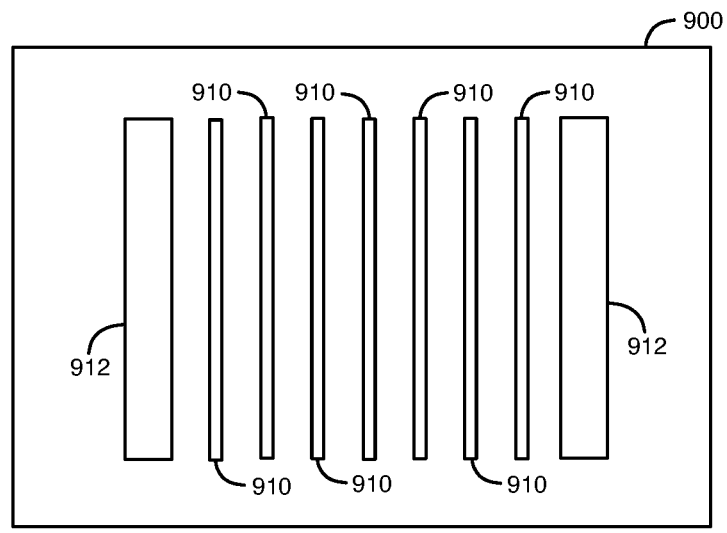
FIG. 9 shows a bottom up view of additional examples of rectangular vertical fluidic channels in a fluid routing device, according to an embodiment.

FIG. 9 shows a bottom up view of examples of rectangular vertical fluidic channels in a fluid routing device 900, according to an embodiment. In the example of FIG. 9, the fluid routing device 900 includes 2 wide rectangular vertical channels 912 and 7 narrow rectangular vertical channels 910. Fluid coolant flows downwards from an inlet of fluid routing device 900 through channels 910 to a horizontal channel, and the warmed coolant flows upwards from the horizontal channel through channels 912 to an outlet of device 900. Fluid routing device 900 of FIG. 9 is an example of fluid routing device 802 shown in FIG. 8. In this example, vertical channels 910 are examples of vertical channels 810 in FIG. 8, and vertical channels 912 are examples of vertical channels 812 in FIG. 8.

Figure 10:
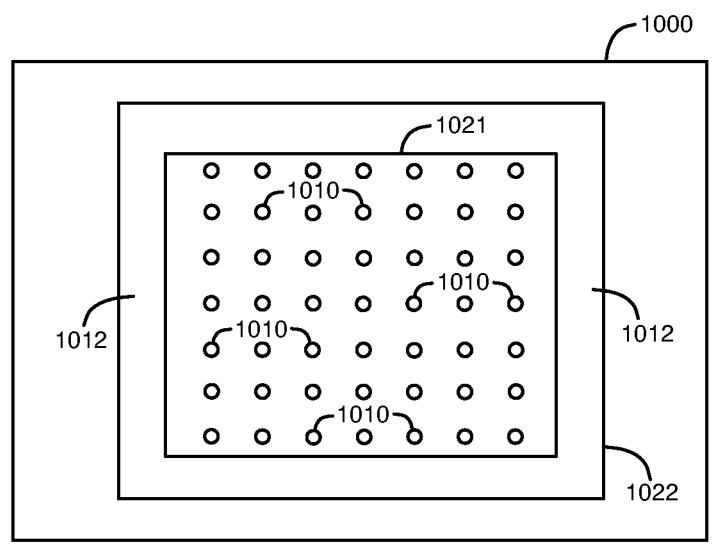
FIG. 10 shows a bottom up view of other examples of vertical fluidic channels in a fluid routing device, according to an embodiment.

FIG. 10 shows a bottom up view of other examples of vertical fluidic channels in a fluid routing device 1000, according to an embodiment. In the example of FIG. 10, the fluid routing device 1000 includes 49 circular vertical channels 1010 and a vertical channel 1012. Channel 1012 is the space between the rectangular edges 1021 and 1022 of device 1000. Channel 1012 surrounds the region of device 1000 that contains channels 1010. Fluid coolant flows downwards from an inlet of fluid routing device 1000 through vertical channels 1010 to a horizontal channel, and the warmed coolant flows upwards from the horizontal channel through vertical channel 1012 to an outlet of device 1000. Fluid routing device 1000 of FIG. 10 is an example of fluid routing device 802 shown in FIG. 8. In this example, vertical channels 1010 are examples of vertical channels 810 in FIG. 8, and vertical channel 1012 is an example of vertical channels 812 in FIG. 8.

Figure 11:
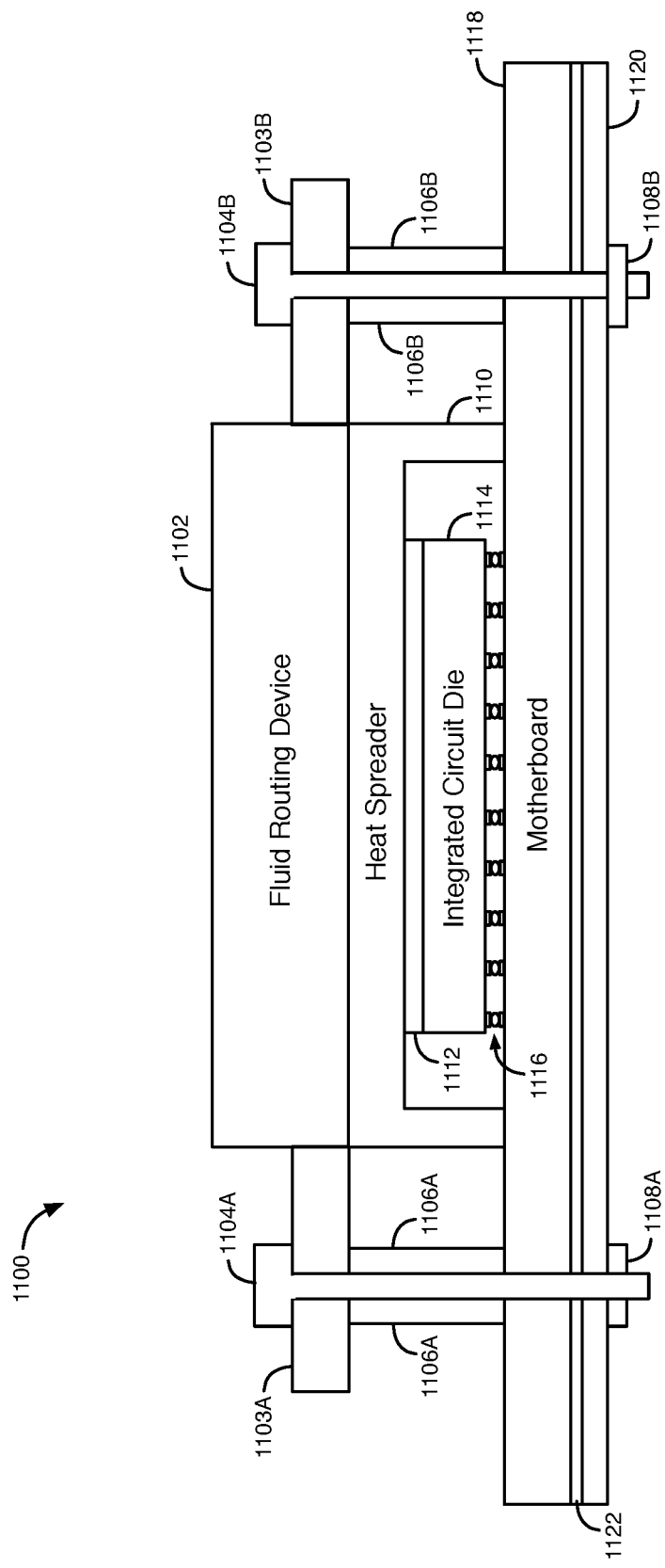
FIG. 11 shows a cross section view of an example of a fluidic cooling system for an integrated circuit package that attaches a fluid routing device to a motherboard and a back plate, according to an embodiment.

FIG. 11 shows a cross section view of an example of a fluidic cooling system 1100 for an integrated circuit package that attaches a fluid routing device to a motherboard and a back plate, according to an embodiment. Fluidic cooling system 1100 includes fluid routing device 1102, heat spreader 1110, TIM 1112, IC die 1114, and solder bumps 1116. Fluid routing device 1102 may be, for example, fluid routing device 102, fluid routing device 202, or fluid routing device 802. Fluidic cooling system 1100 also includes an attachment system that includes connectors 1104A-1104B, extensions 1103A-1103B, springs 1106A-1106B, and nuts 1108A-1108B. The attachment system is used to attach fluid routing device 1102 to a motherboard 1118 and a back plate 1120. An insulation layer 1122 is located between motherboard 1118 and back plate 1120.

Extensions 1103A-1103B are either attached to the sides of fluid routing device 1102 or are integral side extensions of fluid routing device 1102. Each of extensions 1103A-1103B has a circular hole for receiving a respective one of connectors 1104A-1104B. Connectors 1104A-1104B may be, for example, screws or clamps that are used to secure fluid routing device 1102 to motherboard 1118 and back plate 1120. Connectors 1104A-1104B are placed through the holes in the respective extensions 1103A-1103B, through the respective ones of springs 1106A-1106B, and through corresponding holes in motherboard 1118 and back plate 1120. Connectors 1104A-1104B are thus surrounded by springs 1106A-1106B between extensions 1103A-1103B, respectively, and holes in motherboard 1118 and back plate 1120. Springs 1106A-1106B provide some flexibility to the fluidic cooling system 1100. Nuts 1108A-1108B are then secured around the bottoms of connectors 1104A-1104B, respectively, to securely attach fluid routing device 1102 to motherboard 1118 and back plate 1120, as shown in FIG. 11.

The attachment system of FIG. 11 may be used in conjunction with the grooves and O-rings that are shown in and described herein with respect to FIGS. 3 and 4A-4C to connect the fluid routing device 1102 to the heat spreader 1110. The connectors 1104A-1104B can apply downward force on the fluid routing device 1102 to make a secure seal between the fluid routing device 1102 and the heat spreader 1110 using the groove(s) and O-ring of one of FIGS. 4A-4C. The downward force applied by the connectors 1104A-1104B ensures that the O-ring stays within the groove, as shown in FIGS. 4A-4C, so that the fluid routing device 1102 stays attached to the heat spreader 1110.

Fluidic cooling system 1100 may also include quick connects that are used to connect fluid routing device 1102 to a fluid-to-air heat exchanger, a fluid-to-fluid heat exchanger, or directly to facility fluid coolant. A port can be added before the quick connects to add or remove fluid coolant that is provided to or from fluid routing device 1102.

Figure 12:
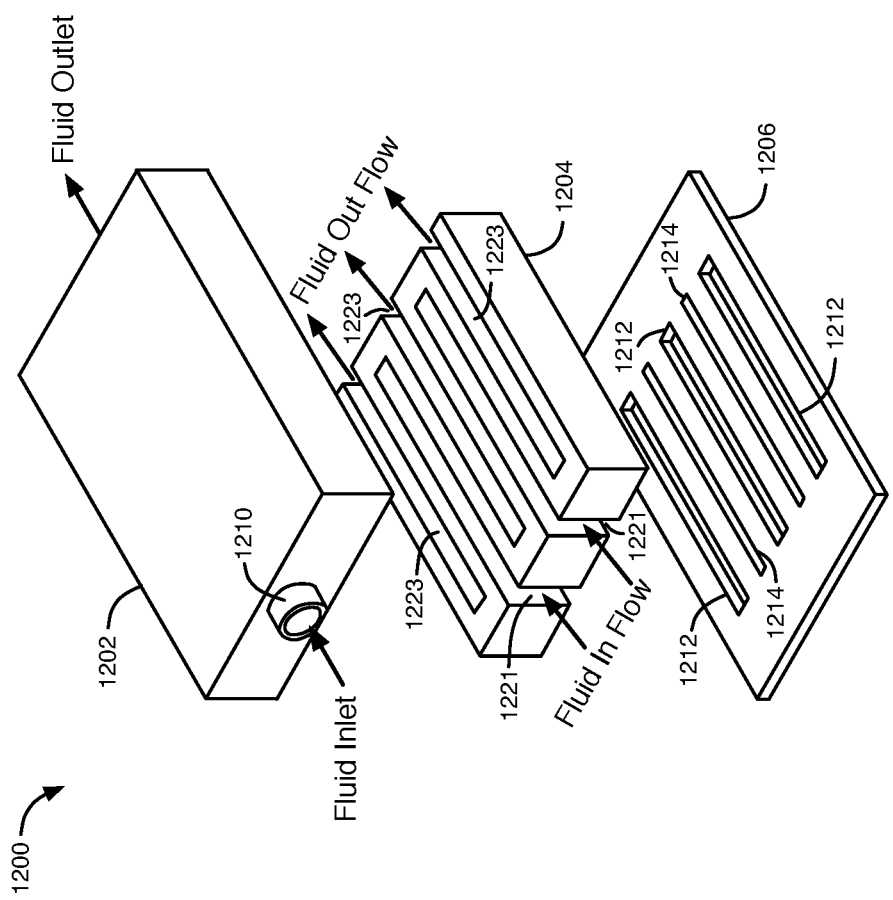
FIG. 12 illustrates an example of a fluid routing device that is constructed from multiple parts, according to a further embodiment.

FIG. 12 illustrates another example of a fluid routing device 1200, according to a further embodiment. Fluid routing device 1200 may be attached to the top of an integrated circuit package in a fluidic cooling system, such as the fluid routing devices disclosed herein with respect to the previous embodiments. Fluid routing device 1200 is an example of a fluid routing device that is constructed from multiple monolithic parts. The parts can be held together with glue, direct bonding, screws, or a clamping mechanism. The parts may be machined, stamped, cast, molded, extruded, or 3D printed.

FIG. 12 shows details of the internal structure of fluid routing device 1200. Fluid routing device 1200 includes a top part 1202, an interior part 1204, and a bottom part 1206. The top part 1202 has a cylindrical fluid inlet 1210 and a cylindrical fluid outlet. The interior part 1204 includes two horizontal channels 1221 through which fluid coolant flows horizontally into device 1200 from the inlet 1210, as shown by arrows in FIG. 12. The bottom part 1206 includes two narrow vertical channels 1214. The fluid coolant flows in through inlet 1210, horizontally through channels 1221, and then vertically down through vertical channels 1214 into a horizontal channel below part 1206 where the coolant directly contacts the heat spreader or the IC die.

The warmed fluid coolant then flows vertically up from the horizontal channel below bottom part 1206 through three wide vertical channels 1212 in bottom part 1206 into three horizontal channels 1223 in interior part 1204. The warmed fluid coolant then flows horizontally through channels 1223 and through the fluid outlet to exit device 1200, as shown by arrows in FIG. 12.

Figure 13:
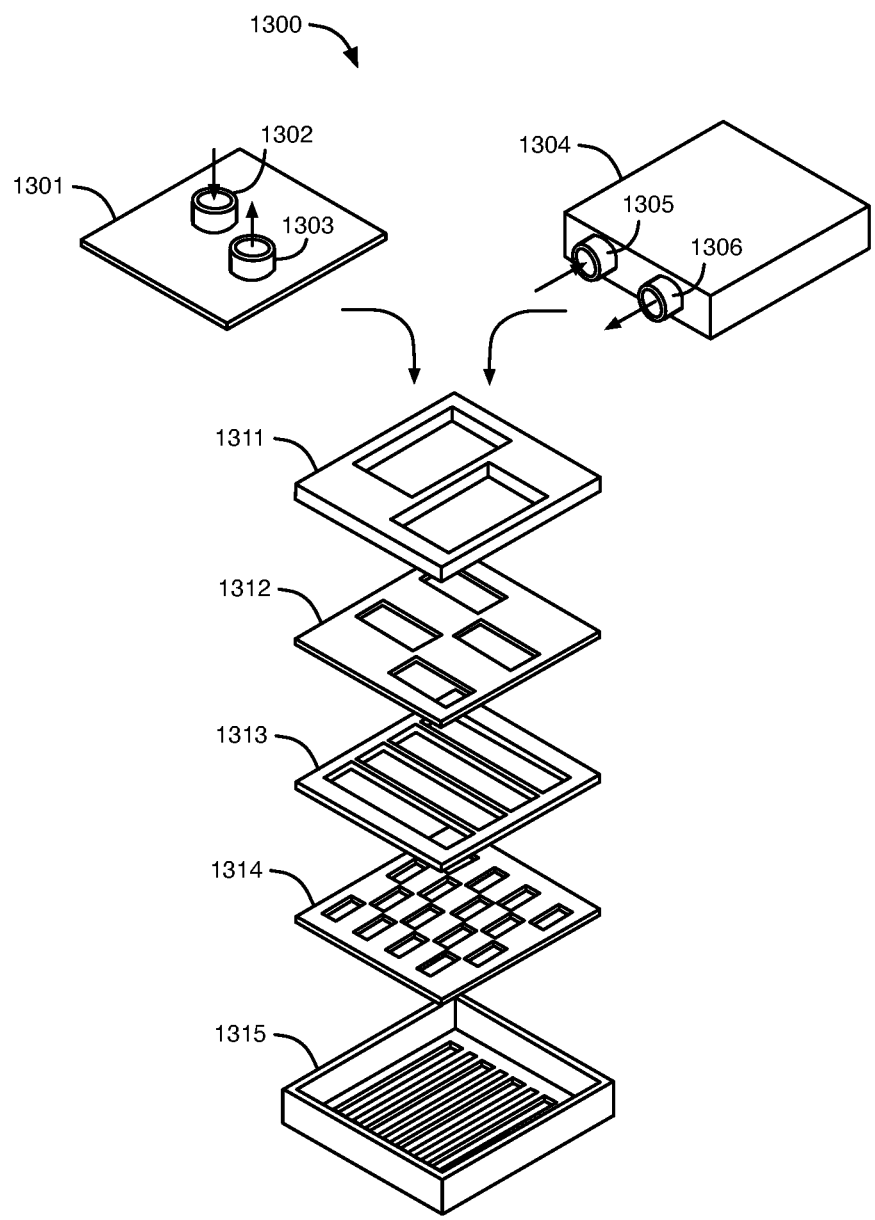
FIG. 13 illustrates another example of a fluid routing device that is constructed from multiple parts, according to a further embodiment.

FIG. 13 illustrates another example of a fluid routing device 1300, according to a further embodiment. Fluid routing device 1300 may be attached to the top of an integrated circuit package in a fluidic cooling system, such as the fluid routing devices disclosed herein with respect to the previous embodiments. Fluid routing device 1300 is another example of a fluid routing device that is constructed from monolithic parts. The parts can be held together with glue, direct bonding, screws, or a clamping mechanism. The parts may be machined, stamped, cast, molded, extruded, or 3D printed.

FIG. 13 shows details of the internal structure of fluid routing device 1300. Fluid routing device 1300 includes a top part 1301 or 1304, interior parts 1311-1314, and a bottom part 1315. Top parts 1301 and 1304 are alternative top parts of device 1300. The top part 1301 has a cylindrical fluid inlet 1302 and a cylindrical fluid outlet 1303 on its top surface. The top part 1304 has a cylindrical fluid inlet 1305 and a cylindrical fluid outlet 1306 on one of its sides. Each of the interior parts 1311-1314 includes two or more openings that allow the flow of fluid coolant from the fluid inlet and back to the fluid outlet. The bottom part 1315 includes 7 rectangular vertical channels. The parts 1301 or 1304 and 1311-1315 are secured together to form device 1300.

The fluid coolant flows into device 1300 through the fluid inlet, down through a first subset of the openings in parts 1311-1314, and then vertically down through a first subset of the vertical channels in part 1315 into a horizontal channel below part 1315 where the coolant contacts the heat spreader or the IC die. The warmed coolant then flows vertically up from the horizontal channel below part 1315 through a second subset of the vertical channels in part 1315, up through a second subset of the openings in parts 1311-1314, and then out through the fluid outlet to exit device 1300.

Figure 14:
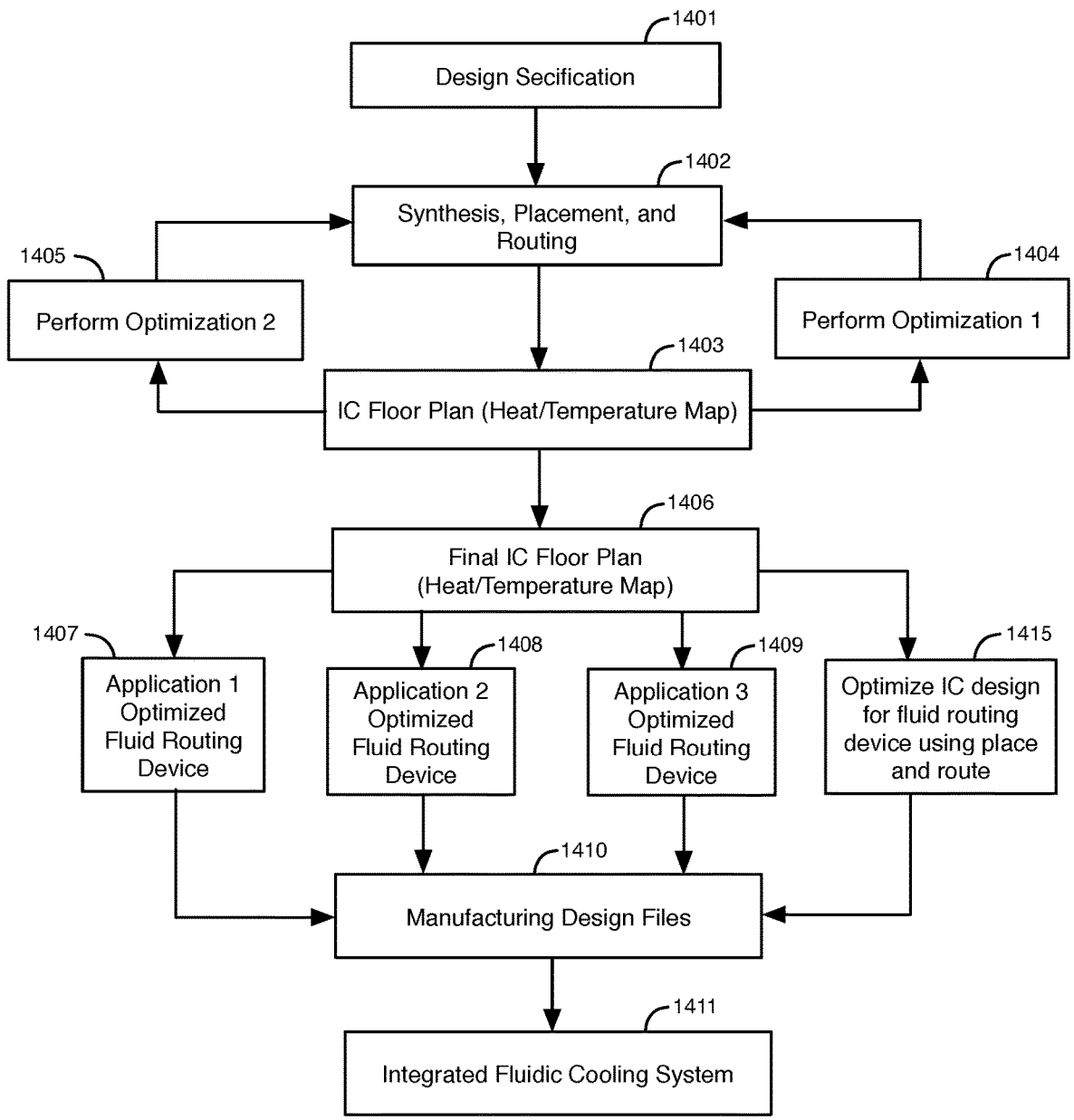
FIG. 14 is a flow chart that illustrates operations that may be performed to generate an optimized fluidic cooling system for an integrated circuit package, according to an embodiment.

FIG. 14 is a flow chart that illustrates operations that may be performed to generate an optimized fluidic cooling system for an integrated circuit package, according to an embodiment. In operation 1401, a design specification for an integrated circuit (IC), such as a programmable logic IC, is generated. In operation 1402, synthesis, placement, and routing are performed for the design specification of the IC. In operation 1403, an IC floor plan is created for the design specification that includes a heat/temperature map. The heat/temperature map may indicate relative heat generation or temperature ranges in the design specification. For example, the heat/temperature map may indicate which areas of the design specification are likely to generate more heat and higher temperatures than other areas.

If some areas of the design specification generate significantly more heat than other areas, one or two optimizations may be performed to the design specification in operations 1404 or 1405 to reduce uneven heat generation in the design specification. Synthesis, placement, and routing are then performed again for the optimized design specification in operation 1402, and a new IC floor plan is generated in operation 1403. If the IC floor plan generated in operation 1403 is optimized, then a final IC floor plan containing a heat/temperature map is generated in operation 1406.

Subsequently, multiple application optimized fluidic cooling designs can be generated after performing multiple place and route experiments. As an example, three application optimized designs for fluid routing devices in fluidic cooling systems are generated in operations 1407, 1408, and 1409 for applications 1, 2, and 3, respectively. In this embodiment, the user of the IC can make very minimal changes to the reference IC design to generate the application optimized designs for the fluid routing devices.

Subsequently, a fluid routing device is selected that is optimized for the design specification and for the particular application. For example, the fluid routing device for one of applications 1, 2, or 3 that is generated in the respective operation 1407, 1408, or 1409 is selected for the design specification. The fluid routing device generated in any one of operations 1407-1409 may be, for example, one of devices 102, 202, or 802.

In an alternative embodiment, a general purpose fluid routing device for a fluidic cooling system is used for the IC. In this embodiment, a place and route tool is used to optimize the IC design for the general purpose fluid routing device in operation 1415, taking into consideration thermal/hot spots in the IC. This embodiment uses a fluidic cooling aware placement, routing, and timing optimization step in operation 1415.

Manufacturing design files are then generated in operation 1410 for the design specification and the selected fluid routing device generated in one of operations 1407-1409. If a general purpose fluid routing device is used, and an optimized IC design is generated in operation 1415, then manufacturing design files are generated for the optimized IC design in operation 1410. An integrated fluidic cooling system is then generated in operation 1411 that includes the fluid routing device selected in one of operations 1407-1409 or a general purpose fluid routing device and an IC die that implements the design specification or the optimized IC design, respectively.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A fluid routing device comprising:
    a fluid inlet;
    first vertical channels that are open to the fluid inlet;
    a horizontal channel that is open to each of the first vertical channels, wherein the first vertical channels are oriented to provide fluid coolant from the fluid inlet vertically down to the horizontal channel, and wherein the horizontal channel is open on one side of the fluid routing device such that an apparatus attached to a bottom of the fluid routing device forms a sidewall of the horizontal channel;
    second vertical channels that are open to the horizontal channel, wherein the second vertical channels are oriented to provide fluid coolant vertically up away from the horizontal channel, wherein the first vertical channels are interleaved between the second vertical channels, and wherein each of the first vertical channels and each of the second vertical channels is directly connected at one end to the horizontal channel; and
    a fluid outlet that is open to the second vertical channels such that fluid coolant from the second vertical channels exits the fluid routing device through the fluid outlet,
    wherein each of the first vertical channels has a constricted opening to the horizontal channel directly above the horizontal channel, wherein a width of the constricted opening of each of the first vertical channels is narrower than a width of the first vertical channel above the constricted opening, and wherein an opening of each of the second vertical channels to the horizontal channel directly above the horizontal channel is wider than the constricted opening to the horizontal channel of each of the first vertical channels.

2. The fluid routing device of claim 1, wherein the first vertical channels comprise at least four vertical channels, and wherein the second vertical channels comprise at least four vertical channels.

3. The fluid routing device of claim 1, wherein each of the first and second vertical channels is rectangular in shape from a bottom up perspective of the fluid routing device.

4. The fluid routing device of claim 1, wherein each of the first and second vertical channels is circular in shape from a bottom up perspective of the fluid routing device.

5. The fluid routing device of claim 1, wherein each of the first vertical channels is circular in shape from a bottom up perspective of the fluid routing device.

6. The fluid routing device of claim 1, wherein the first vertical channels comprise at least three vertical channels, and wherein the second vertical channels comprise at least three vertical channels.

7. The fluid routing device of claim 1, wherein the first and second vertical channels are circular in shape and are arranged in multiple rows in the fluid routing device from a bottom up perspective of the fluid routing device.

8. The fluid routing device of claim 1 further comprising:
    a groove in the bottom of the fluid routing device, wherein the groove surrounds the first and second vertical channels, and wherein the groove is sized to receive an O-ring in an apparatus attached to the bottom of the fluid routing device.

9. The fluid routing device of claim 1 further comprising:
    an O-ring attached to the bottom of the fluid routing device, wherein the O-ring surrounds the first and second vertical channels, and wherein the O-ring is sized to fit into a groove in an apparatus attached to the bottom of the fluid routing device.

10. A fluidic cooling system comprising:
    an integrated circuit package; and
    a fluid routing device attached to the integrated circuit package, wherein the fluid routing device comprises:
    first vertical channels,
    a horizontal channel that opens to each of the first vertical channels, and
    second vertical channels that are open to the horizontal channel, wherein the first vertical channels are interleaved between the second vertical channels, and wherein each of the first vertical channels and each of the second vertical channels is directly connected at one end to the horizontal channel,
    wherein the first vertical channels are oriented to provide fluid coolant vertically down to the horizontal channel, wherein the horizontal channel is open on one side of the fluid routing device such that a surface of the integrated circuit package that is attached to a bottom of the fluid routing device forms a sidewall of the horizontal channel, and wherein the second vertical channels are oriented to provide fluid coolant vertically up away from the horizontal channel,
    wherein each of the first vertical channels has a constricted opening to the horizontal channel directly above the horizontal channel, wherein a width of the constricted opening of each of the first vertical channels is narrower than a width of the first vertical channel above the constricted opening, and wherein an opening of each of the second vertical channels to the horizontal channel directly above the horizontal channel is wider than the constricted opening to the horizontal channel of each of the first vertical channels.

11. The fluidic cooling system of claim 10, wherein the integrated circuit package comprises a heat spreader, wherein the fluid routing device is attached to the heat spreader, and wherein the horizontal channel is open on one side such that fluid coolant in the horizontal channel directly contacts a surface of the heat spreader.

12. The fluidic cooling system of claim 10, wherein the integrated circuit package comprises an integrated circuit die.

13. The fluidic cooling system of claim 10, wherein the fluid routing device comprises a groove in its bottom surface that surrounds the first and second vertical channels, and
wherein the integrated circuit package comprises an O-ring that is inside an entire length of the groove causing the fluid routing device to be connected to the integrated circuit package.

14. The fluidic cooling system of claim 10, wherein the integrated circuit package comprises a groove in its top surface,
wherein the fluid routing device comprises an O-ring attached to its bottom surface that surrounds the first and second vertical channels, and wherein the O-ring is inside an entire length of the groove causing the fluid routing device to be connected to the integrated circuit package.

15. The fluidic cooling system of claim 10, wherein the first vertical channels comprise at least three vertical channels, and wherein the second vertical channels comprise at least three vertical channels.

16. A method for cooling an integrated circuit package, the method comprising:
providing fluid coolant from a fluid inlet in a fluid routing device to first vertical channels in the fluid routing device;
providing the fluid coolant vertically down through the first vertical channels to a horizontal channel in the fluid routing device, wherein the horizontal channel is directly open to each of the first vertical channels such that the fluid coolant flows from the first vertical channels to the horizontal channel without passing through other channels in the fluid routing device, wherein each of the first vertical channels has a constricted opening to the horizontal channel directly above the horizontal channel, and wherein a width of the constricted opening of each of the first vertical channels is narrower than a width of the first vertical channel above the constricted opening;
providing the fluid coolant horizontally through the horizontal channel such that the fluid coolant in the horizontal channel directly contacts the integrated circuit package as the fluid coolant flows through the horizontal channel, wherein the integrated circuit package is attached to the fluid routing device;
providing the fluid coolant vertically up through second vertical channels in the fluid routing device away from the horizontal channel, wherein each of the second vertical channels is directly open to the horizontal channel such that the fluid coolant flows from the horizontal channel to the second vertical channels without passing through other channels in the fluid routing device, wherein the first vertical channels are interleaved between the second vertical channels, and wherein an opening of each of the second vertical channels to the horizontal channel directly above the horizontal channel is wider than the constricted opening to the horizontal channel of each of the first vertical channels; and
providing the fluid coolant from the second vertical channels out through a fluid outlet in the fluid routing device.

17. The method of claim 16, wherein the first vertical channels comprise at least three vertical channels, and wherein the second vertical channels comprise at least three vertical channels.

18. The method of claim 16, wherein the integrated circuit package comprises an integrated circuit die.

19. The method of claim 16, wherein each of the first and second vertical channels is rectangular in shape from a bottom up perspective of the fluid routing device.

* * * * *